3,056,767
COPOLYMERS OF VINYLIDENE FLUORIDE, HEXAFLUOROPROPENE, AND PERFLUORO-2-BUTENE

John Raymond Pailthorp and John Frederick Smith, Wilmington, Del., assignors to E. I. du Pont de Nemours and Company, Wilmington, Del., a corporation of Delaware
No Drawing. Filed Nov. 14, 1960, Ser. No. 68,669
2 Claims. (Cl. 260—80.5)

This invention is directed to copolymers prepared by copolymerizing vinylidene fluoride, hexafluoropropene and perfluoro-2-butene in certain ratios in an aqueous medium under pressure in the presence of a free-radical catalyst.

Copolymers containing 70–30% by weight of vinylidene fluoride and 30–70% of hexafluoropropene are elastomers of superior properties where resistance to high temperatures and to attack by hydrocarbon solvents is important. Copolymers containing vinylidene fluoride, hexafluoropropene, and tetrafluoroethylene in certain proportions are significantly superior in some respects to the polymers containing only vinylidene fluoride and hexafluoropropene. There is, however, still a need for additional economically attractive copolymers of vinylidene fluoride and hexafluoropropene with a third monomer, which copolymers possess desirable elastomeric properties. The problem of developing such copolymers is not a simple one since most readily available monomers, when introduced into the vinylidene fluoride/hexafluoropropene polymerization system, act as "poisons" to the system, that is, they inhibit the polymerization. It is not readily predictable what monomers will be copolymerizable in the vinylidene fluoride/hexafluoropropylene polymerization system or that a copolymer thereof, when successfully produced, will possess attractive elastomeric properties.

It is therefore an object of the present invention to provide novel copolymers of vinylidene fluoride, hexafluoropropylene, and perfluoro-2-butene, which copolymers possess significant elastomeric properties.

These and other objects will become apparent in the following description and claims.

More specifically, the present invention is directed to copolymers prepared by copolymerizing 1–3 moles of vinylidene fluoride with 0.8–0.4 mole of hexafluoropropene and 0.2–0.6 mole of perfluoro-2-butene, the molar sum of the latter two being equal to 1.0, the polymerization being carried out under superatmospheric pressure at 50–150° C. in the presence of a free-radical catalyst.

The proportion of the monomers in the monomer mixture is critical. If more than 3 moles of vinylidene fluoride per total of one mole of the other two monomers is used, the final cured polymer is plastic rather than elastic, that is the final cured polymer is nonelastomeric. There is no advantage in using more than one (1) mole of the other two monomers per mole of vinylidene fluoride since the excess of these monomers beyond one molar proportion will not polymerize. If less than 0.2 mole of perfluoro-2-butene is used, the resulting polymer is not significantly different from the vinylidene fluoride/hexafluoropropene copolymer. If more than 0.6 mole of perfluoro-2-butene is used, the yield of polymer will be significantly reduced.

Any of the conventional catalysts yielding free radicals may be used to produce the novel copolymers of this invention. These include organic and inorganic peroxides such as benzoyl peroxide, cumene hydroperoxide, dicumyl peroxide, and salts of persulfuric acid; and azo compounds such as alpha,alpha'-azodiisobutyronitrile. The preferred catalysts are the sodium, potassium or ammonium salts of persulfuric acid.

The quantity of catalyst used in the preparation of the copolymers of this invention ranges from about 0.5 part to 4.0 parts per hundred parts of total monomers. Less than 0.5 part gives a product having too high a molecular weight [that is, the product is difficult to mill and is too scorchy for customary curing processes]. More than 4.0 parts give a product having too low a molecular weight [that is, the product is gummy and sticky and, when cured, has inferior tensile properties and low resistance to aging]. The preferred range is 0.65 to 1.5 parts. Optionally, 0.1 to 0.5 part of sodium or potassium bisulfite may be used, if improvement in rate of polymerization is desired. However, the presence of the bisulfite is not required.

The quantity of water in the polymerization system is not critical. However, sufficient water must be present to provide a medium in which the polymerization will take place and to aid in working up the product. Quantities varying from 100 to 400 parts per 100 parts of total monomers may be used. The preferred quantity is 150 to 200 parts per hundred parts of monomer.

The polymerization is preferably carried out at a temperature in the range of about 50° C. to about 150° C. At temperatures of less than 50° C. the rate of polymerization is too slow to be practical. At temperatures higher than about 150° C. the polymerization is difficult to control. The preferred temperature range is about 90–100° C.

Pressures ranging from about 400 p.s.i.g. to about 2000 p.s.i.g. are utilized according to the present invention. Polymerization will not take place at pressures lower than 400 p.s.i.g. There is no advantage to be gained by operating at pressures above 2000 p.s.i.g. and it is less economical. The preferred pressure range is from 800 to 1000 p.s.i.g.

Optionally, conventional polymerization assistants may be used. For example, if desired, up to 2 parts, per hundred parts of monomer, of a buffering agent such as disodium phosphate may be used. Also, up to 4 parts of a surface-active agent may be used. It is necessary to use the surface-active agent if the elastomer is to be obtained in the form of a latex. Suitable surface-active agents include water-soluble salts of polyfluorinated fatty acids. Representative examples of such surface-active agents are the ammonium, sodium, and potassium salts of perfluorooctanoic acid, perfluorodecanoic acid, and perfluorooctadecanoic acid, omega-hydroperfluorononanoic acid, omega-hydroperfluoroundecanoic acid, and omega-hydroperfluoroheptadecanoic acid.

The polymerization is preferably carried out in a stainless steel pressure reactor or other type of equipment which will not be attacked during the process. In a batch process the vessel is flushed free from oxygen with a gas such as nitrogen and is then charged with deoxygenated water and the catalyst and other assistants that are to be used. After closing, evacuating, and cooling the vessel, the gaseous reactants are introduced and the vessel is heated to the desired temperature while the contents of the vessel are agitated. When the reaction is completed, the mass is cooled to room temperature and any unreacted gas is removed. The resultant polymer emulsion is discharged from the reactor and coagulated with acids or salts in the conventional manner. The polymer is washed with water and dried.

The process can be carried out in a continuous manner wherein the monomers, catalyst, water, etc. are continuously fed into the reaction vessel in the desired proportions, the reaction being carried out under constant conditions of pressure, temperature, rate of conversion, ratio of catalyst to monomers fed, etc. The polymerization mass is continuously removed from the reaction vessel and then fed to a pressure reducing valve through which it is introduced to the coagulation part of the process at about atmospheric pressure.

The copolymers of the present invention may be cured with the same curing agents and by the same procedures as known fluoroelastomers, such as the vinylidene fluoride/hexafluoropropene copolymers. Suitable curing agents are hexamethylenediamine carbamate, benzoyl peroxide, high energy radiation, N,N'-bis(arylalkylidene)-alkylenediamines, aliphatic and cycloaliphatic diamines, and organic dimercaptans in conjunction with aliphatic tertiary amines. An acid acceptor such as magnesium oxide or zinc oxide is usually used in combination with the curing agents.

The copolymer produced according to this invention may be compounded with conventional reinforcing agents such as carbon black and silica. Pigments may be incorporated for color effects.

Conventional rubber compounding techniques may be utilized in compounding the copolymers of this invention. They readily band out on a cold rubber mill, and compounding ingredients may be added on the mill in the usual way.

The copolymers of this invention show heat-aging properties superior to those of the vinylidene fluoride/hexafluoropropene copolymers. This is evidenced by better retention of elongation at the break during aging at 288° C. These copolymers also have less tendency to evolve hydrogen fluoride at high temperatures as shown by a lower percentage of weight loss during heating. These properties make these copolymers particularly well suited for applications in which they will be exposed to high temperatures. Such applications include use in O-rings, packings and seals, for coating glass fabrics, and as a binder for asbestos fibers.

Representative examples illustrating the present invention are as follows.

*Example 1*

A. Into a 400-cc. stainless-steel bomb, which had been flushed free of oxygen by means of nitrogen gas, was placed a freshly prepared solution of 1.04 g. of ammonium persulfate and 0.20 g. of sodium bisulfite, 2.0 g. of sodium monohydrogen phosphate, and 0.5 g. of ammonium perfluorooctanoate in 200 g. of deoxygenated deionized water. The contents were frozen by immersing the bomb in a mixture of acetone and solid $CO_2$ and the bomb was closed and evacuated. There was then charged into the bomb 60 g. of vinylidene fluoride, 40 g. of hexafluoropropene, and 20 g. of perfluoro-2-butene. The bomb was closed again, placed in a shaker, heated to 100° C., and shaken at that temperature for 10 hours. The maximum pressure was 850 p.s.i.g., and the pressure dropped to 350 p.s.i.g. within the first two hours of the polymerization. The bomb was cooled and vented. The amount of residual monomers was 60 g. The polymer was coagulated by the addition of sodium chloride. The coagulated polymer was removed, placed in a Waring Blendor, washed with water until free of acid, and mill-dried at 100° C.

B. A control sample was made by the same procedure as described in paragraph A except that the monomers used were 60 g. of vinylidene fluoride and 40 grams of hexafluoropropene. In this polymerization the maximum pressure was 800 p.s.i.g.

C. The properties of the polymers of preceding paragraphs A and B were as follows:

| | A | B |
|---|---|---|
| Intrinsic viscosity | 0.94 | 1.09 |
| Ratio of $CF_2$ to $CF_3$ groups (determined by nuclear magnetic resonance) | 4.5 | 5.05 |

Two-gram samples of the raw polymers were placed in an oven at 288° C. and the weight loss was determined at the end of 48 hours. The copolymer of paragraph A lost only 2.6 percent of its weight whereas the control sample of paragraph B lost 5.2 percent.

The polymers were compounded on a rubber roll mill using the following recipe:

| | Parts by weight |
|---|---|
| Polymer | 100 |
| Medium thermal carbon black | 20 |
| Magnesia | 15 |
| Hexamethylenediamine carbamate | 1 |

The compounded stock was put in molds in a press and heated at 150° C. for one hour, removed from the molds and heated at 204° C. for 24 hours. Stress-strain properties of the samples were determined at room temperature. Samples were then heat-aged at 288° C. for 48 hours and their stress-strain properties determined at room temperature. The stress-strain values of the copolymer (A) and of the control sample (B) are shown below.

| | Original | | After Heat Aging | | Percent Retained After Heat Aging | |
|---|---|---|---|---|---|---|
| | A | B | A | B | A | B |
| Tensile strength at break, p.s.i. | 2,725 | 2,240 | 1,580 | 1,070 | 58 | 48 |
| Elongation at break, percent | 280 | 320 | 250 | 190 | 89 | 60 |
| Modulus at 100% elongation, p.s.i. | 1,075 | 320 | 1,000 | 600 | 93 | 190 |

*Example 2*

The procedure of Example 1A was repeated except that the following quantities of monomers were used:

| | Grams | |
|---|---|---|
| | A | B |
| Vinylidene fluoride | 54 | 45 |
| Hexafluoropropene | 30 | 50 |
| Perfluoro-2-butene | 36 | 60 |

The maximum pressure attained in the bomb was 800 p.s.i.g.

The resulting polymers had the following properties:

| | A | B |
|---|---|---|
| Intrinsic viscosity | 0.59 | 0.41 |
| Ratio of $CF_2$ to $CF_3$ groups (determined by neutron magnetic resonance) | 6.94 | 5.42 |

It is to be understood that any one of the heretofore-described free-radical catalysts may be substituted in the preceding examples to give essentially the same results. In addition, modifications and variations of the preceding examples as would be undertaken by one skilled in the art are contemplated to be within the scope of the present invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Elastomeric copolymers prepared by copolymerizing a mixture of monomers consisting essentially of 1 to 3 moles of vinylidene fluoride with 0.8 to 0.4 mole of hexafluoropropene and 0.2 to 0.6 mole of perfluoro-2-butene, the molar sum of said hexafluoropropene and said perfluoro-2-butene being equal to 1.0, said polymerization being carried out under superatmospheric pressure at a temperature within the range of from 50° C. to 150° C. in the presence of a free-radical catalyst.

2. Cured elastomeric copolymers prepared by copolymerizing a mixture of monomers consisting essentially of 1 to 3 moles of vinylidene fluoride with 0.8 to 0.4 mole of hexafluoropropene and 0.2 to 0.6 mole of perfluoro-2-butene, the molar sum of said hexafluoropropene and said perfluoro-2-butene being equal to 1.0, said polymerization being carried out under superatmospheric pressure at a temperature within the range of from 50° C. to 150° C. in the presence of a free-radical catalyst, said copolymers being cured with a curing agent selected from the group consisting of hexamethylenediamine carbamate, benzoyl peroxide, high energy radiation, N,N'-bis(arylalkylidene)alkylenediamines, aliphatic diamines, cycloaliphatic diamines, and organic dimercaptans in conjunction with aliphatic tertiary amines.

References Cited in the file of this patent
UNITED STATES PATENTS

| | | |
|---|---|---|
| 2,705,706 | Dittman et al. | Apr. 5, 1955 |
| 2,842,528 | Herbst et al. | July 8, 1958 |
| 2,944,995 | Dosmann et al. | July 12, 1960 |
| 2,965,619 | Honn et al. | Dec. 20, 1960 |